US012567702B2

(12) United States Patent
Giga et al.

(10) Patent No.: US 12,567,702 B2
(45) Date of Patent: Mar. 3, 2026

(54) LEVER-TYPE CONNECTOR

(71) Applicant: SUMITOMO WIRING SYSTEMS, LTD., Mie (JP)

(72) Inventors: Ryousuke Giga, Mie (JP); Yuki Horiguchi, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 349 days.

(21) Appl. No.: 18/271,778

(22) PCT Filed: Dec. 27, 2021

(86) PCT No.: PCT/JP2021/048471
§ 371 (c)(1),
(2) Date: Jul. 11, 2023

(87) PCT Pub. No.: WO2022/153853
PCT Pub. Date: Jul. 21, 2022

(65) Prior Publication Data

US 2024/0055799 A1 Feb. 15, 2024

(30) Foreign Application Priority Data

Jan. 14, 2021 (JP) ................................ 2021-004283

(51) Int. Cl.
*H01R 13/629* (2006.01)

(52) U.S. Cl.
CPC .............................. *H01R 13/62933* (2013.01)

(58) Field of Classification Search
None
See application file for complete search history.

(56) References Cited

U.S. PATENT DOCUMENTS 5,888,081 A * 3/1999 Konoya ........... H01R 13/62938 439/157
6,736,655 B2 * 5/2004 Martin ............ H01R 13/62944 439/372
(Continued)

FOREIGN PATENT DOCUMENTS

JP H08-330023 A 12/1996
JP H10-074563 A 3/1998
JP 2006-114357 A 4/2006
(Continued)

OTHER PUBLICATIONS

International Search Report issued on Feb. 15, 2022 for WO 2022/153853 A1 (4 pages).

*Primary Examiner* — Ross N Gushi
(74) *Attorney, Agent, or Firm* — Venjuris, P.C.

(57) ABSTRACT

A lever-type connector is provided with a connector housing to be connected to a mating connector housing, a cover for covering wires pulled out from the connector housing in a state bent in a direction different from a pull-out direction from the connector housing, and a lever rotatable between a connection start position and a connection end position. The cover includes two side walls, a rear wall coupling the two side walls, base portions provided at positions near the connector housing with the cover mounted on the connector housing and bulging portions having a larger interval between the two side walls than the base portions at positions near the rear wall.

6 Claims, 10 Drawing Sheets

(56) References Cited

U.S. PATENT DOCUMENTS

| | | | |
|---|---|---|---|
| 2007/0128900 | A1 | 6/2007 | Bauman et al. |
| 2012/0208383 | A1 | 8/2012 | Kobayashi et al. |

FOREIGN PATENT DOCUMENTS

| | | | |
|---|---|---|---|
| JP | 2010-062077 | A | 3/2010 |
| JP | 2013-048046 | A | 3/2013 |
| KR | 20-2009-0005427 | U | 6/2009 |

* cited by examiner

LEVER-TYPE CONNECTOR

CROSS REFERENCE TO RELATED APPLICATIONS

This application is a national phase of PCT application No. PCT/JP2021/048471, filed on 27 Dec. 2021, which claims priority from Japanese patent application No. 2021-004283, filed on 14 Jan. 2021, all of which are incorporated herein by reference.

TECHNICAL FIELD

The present disclosure relates to a lever-type connector.

BACKGROUND

Conventionally, a lever-type connector is known from Japanese Patent Laid-open Publication No. 2011-146249 (Patent Document 1). This lever-type connector includes a connector housing for housing terminals on ends of wires, a wire cover for guiding the wires to outside by being mounted on a wire pull-out side of the connector housing, a lever rotatably mounted on the connector housing for moving a mating connector from an incomplete connection position to a complete connection position by being rotated with the mating connector incompletely connected to the connector housing, a locking portion provided on the lever, and a lock portion provided on the wire cover and to be engaged with the locking portion of the lever completely connecting the connector housing and the mating connector.

PRIOR ART DOCUMENT

Patent Document

Patent Document 1: JP 2011-146249 A

SUMMARY OF THE INVENTION

Problems to be Solved

In the case of increasing the wires to be led out from the connector housing, it is considered to increase a height of the wire cover in a lead-out direction of the wires from the connector housing to accommodate the wires.

However, it is not preferable that the lever-type connector is enlarged as a whole due to an increase in the height of the wire cover.

The present disclosure was completed on the basis of the above situation and aims to provide a lever-type connector, the enlargement of which is suppressed even if wires to be led out from a connector housing are increased.

Means to Solve the Problem

The present disclosure is directed to a lever-type connector with a connector housing to be connected to a mating connector housing, a cover to be mounted on the connector housing, the cover covering a wire pulled out from the connector housing in a state bent in a direction different from a pull-out direction from the connector housing, and a lever to be mounted on the connector housing, the lever being rotatable between a connection start position and a connection end position, the cover including two side walls and a rear wall coupling the two side walls, the cover including base portions provided at positions near the connector housing with the cover mounted on the connector housing and bulging portions having a larger interval between the two side walls than the base portions at positions near the rear wall, the lever being disposed outside the cover, the lever including two side plates and a rear plate coupling the two side plates, and the lever including narrow portions provided at positions near the connector housing with the lever mounted on the connector housing and wide portions having a larger interval between the two side plates than the narrow portions at positions near the rear plate.

Effect of the Invention

According to the present disclosure, the enlargement of a lever-type connector can be suppressed even in the case of increasing wires to be led out from a connector housing.

DETAILED DESCRIPTION TO EXECUTE THE INVENTION

Description of Embodiments of Present Disclosure

Figure 1:
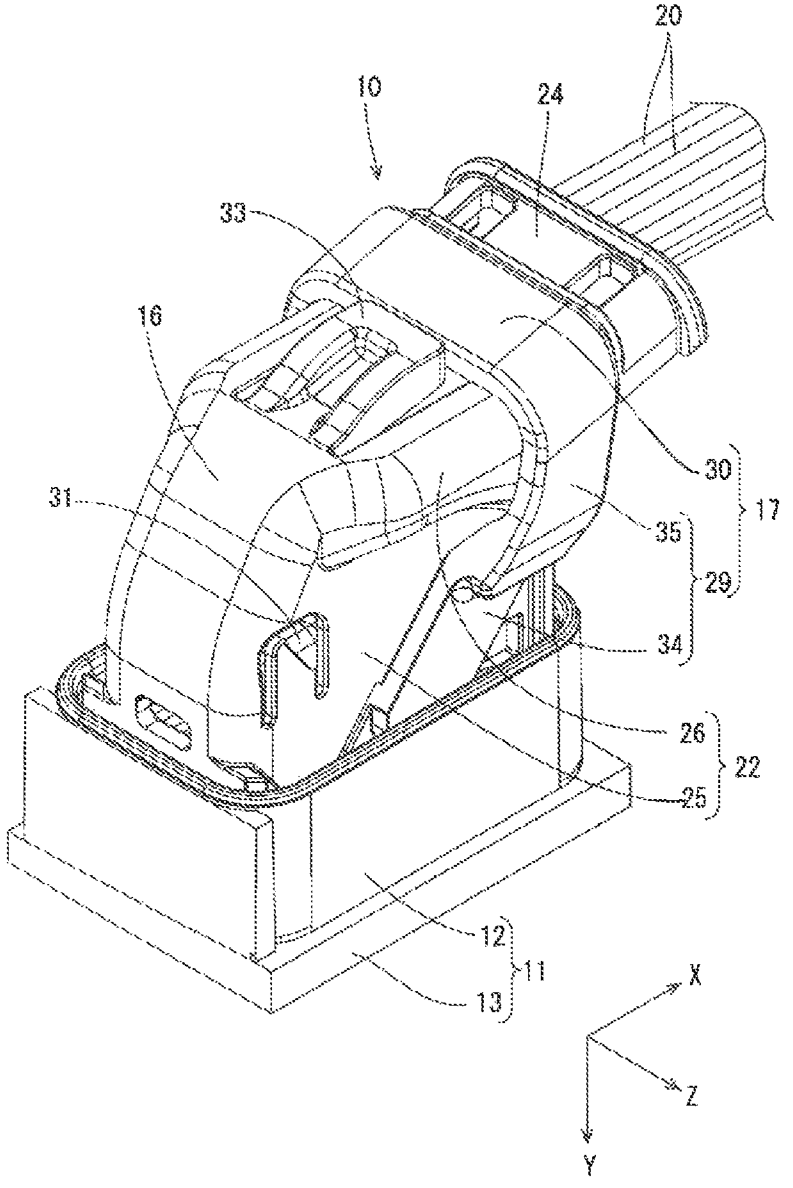
FIG. 1 is a perspective view showing a lever-type connector according to a first embodiment.

First, embodiments of the present disclosure are listed and described.

(1) The lever-type connector of the present disclosure is provided with a connector housing to be connected to a mating connector housing, a cover to be mounted on the connector housing, the cover covering a wire pulled out from the connector housing in a state bent in a direction different from a pull-out direction from the connector housing, and a lever to be mounted on the connector housing, the lever being rotatable between a connection start position and a connection end position, the cover including two side walls and a rear wall coupling the two side walls, the cover including base portions provided at positions near the connector housing with the cover mounted on the connector housing and bulging portions having a larger interval between the two side walls than the base portions at positions near the rear wall, the lever being disposed outside the cover, the lever including two side plates and a rear plate coupling the two side plates, and the lever including narrow portions provided at positions near the connector housing with the lever mounted on the connector housing and wide portions having a larger interval between the two side plates than the narrow portions at positions near the rear plate.

Since the wire is disposed inside the bulging portions of the cover, a length of the cover can be reduced in a front-rear direction as compared to the case where the bulging portions are not provided. In this way, the enlargement of the lever-type connector as a whole can be suppressed even if the number of wires to be led out from the female connector housing is increased.

(2) Preferably, inner surfaces of the wide portions of the lever contact outer surfaces of the bulging portions of the cover at least near the connection end position.

The lever includes the wide portions having a larger interval between the side plates than the narrow portions. Thus, there is a concern for the deformation of the lever due to the collision of an external matter with the wide portion. If the lever is deformed while being held at the connection end position, there is a concern for the rotation of the lever from the connection end position toward the connection start position. In the present disclosure, the deflection and deformation of the narrow portions of the lever in directions toward each other are suppressed by the bulging portions of the lever. In this way, the rotation of the lever from the connection end position toward the connection start position can be suppressed even if an external matter collides with the wide portion.

Note that, as described later, the vicinity of the connection end position of the lever includes the connection end position and also includes a position immediately before the connection end position in the process of rotating the lever from the connection start position to the connection end position.

(3) Preferably, inner surfaces of the narrow portions of the lever are in contact with outer surfaces of the base portions of the cover.

Since the narrow portions of the lever are supported from inside by the base portions of the cover, the deflection and deformation of the narrow portions of the lever in the directions toward each other are suppressed when the lever rotates between the connection start position and the connection end position. Further, since the lever is guided by the outer surfaces of the base portions of the cover, the lever can be smoothly rotated between the connection start position and the connection end position.

(4) Preferably, the cover includes coupling portions coupling the bulging portions and the base portions, and fingers are placed on the coupling portion when the cover is mounted on the connector housing or when the cover is removed from the connector housing.

There are steps between the bulging portions and the base portions. These steps are coupled by the coupling portions. The cover can be easily held by placing fingers on the coupling portions when the worker holds the cover. Further, the lever-type connector can be easily separated from a male connector by the worker placing fingers on the coupling portions and pulling the coupling portions rearward.

Details of Embodiment of Present Disclosure

Hereinafter, embodiments of the present disclosure are described. The present disclosure is not limited to these illustrations and is represented by claims and intended to include all changes in the scope of claims and in the meaning and scope of equivalents.

First Embodiment

Figure 2:
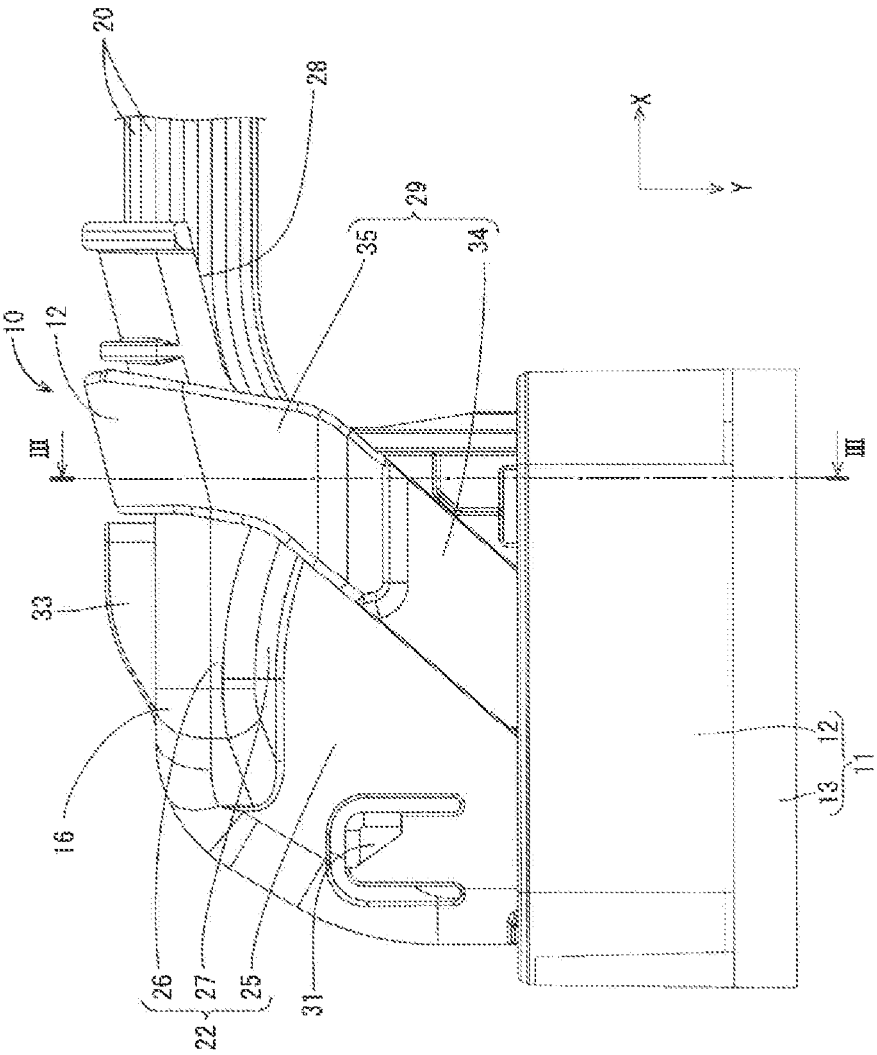
FIG. 2 is a side view showing the lever-type connector.

A first embodiment of the present disclosure is described with reference to FIGS. 1 to 6. As shown in FIGS. 1 and 2, a lever-type connector 10 according to this embodiment is connected to a male connector 11. In the following description, a direction represented by an arrow Z is referred to as an upward direction, a direction represented by an arrow Y is referred to as a forward direction, and a direction represented by an arrow X is referred to as a leftward direction. Further, for a plurality of identical members, only some members may be denoted by a reference sign and the other members may not be denoted by the reference sign.

[Male Connector 11]

Figure 3:
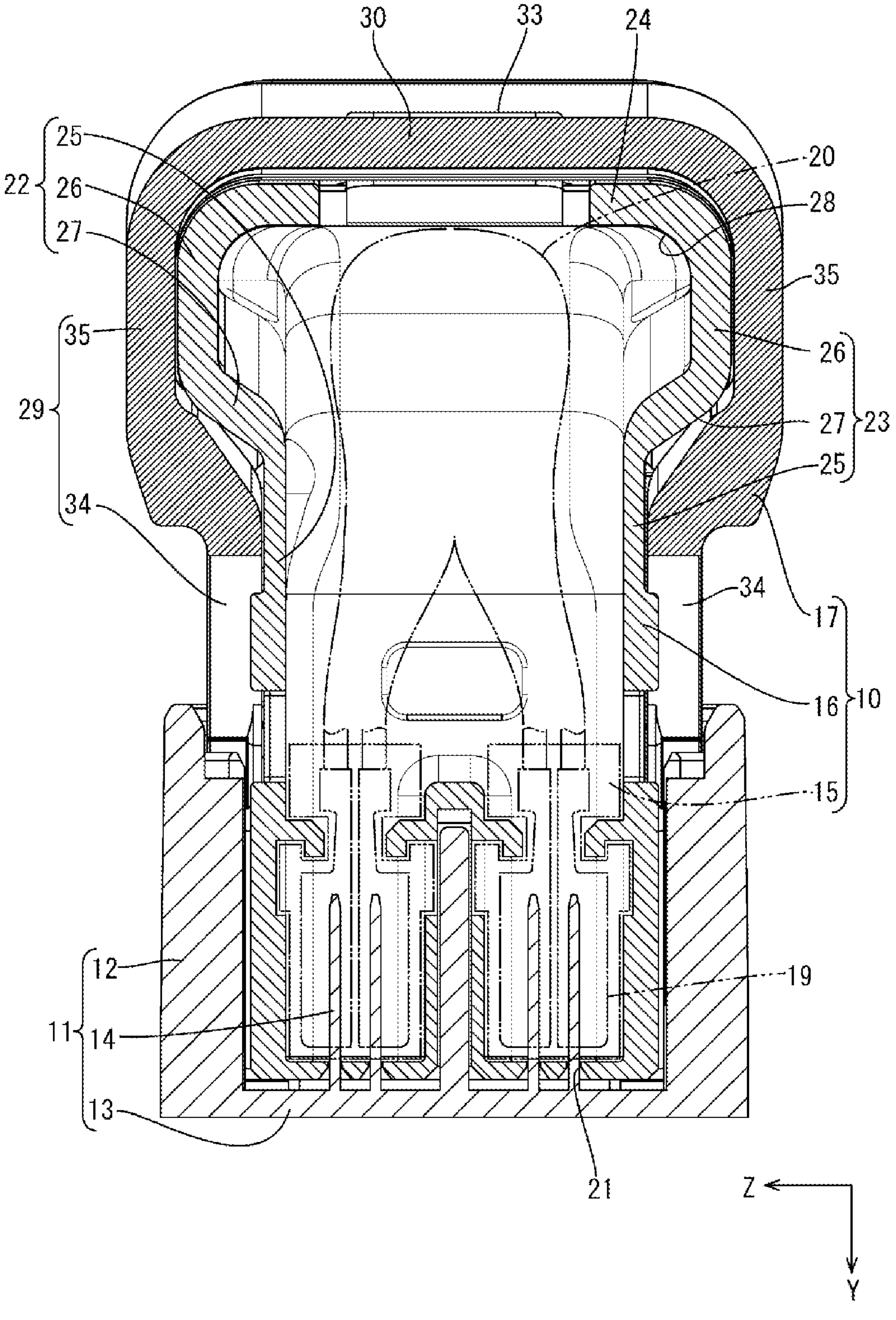
FIG. 3 is a section along in FIG. 1.

As shown in FIG. 3, the male connector 11 includes a male connector housing 13 (an example of a mating connector housing) made of synthetic resin and provided with a receptacle 12 open rearward and male terminals 14 to be mounted into the male connector housing 13. The male terminal 14 is in the form of a plate made of electrically conductive metal and extending in a front-rear direction. A rear end part of the male terminal 14 is disposed in the receptacle 12. Although not shown in detail, a front end part of the male terminal 14 penetrates forward through a front wall provided on the front end of the receptacle 12 and is electrically connected to an external circuit.

[Lever-Type Connector 11]

As shown in FIG. 3, the lever-type connector 10 is provided with a female connector housing 15 (an example of a connector housing), a cover 16 to be mounted on the female connector housing 15 and a lever 17 to be rotatably mounted on the female connector housing 15.

[Female Connector Housing 15]

The female connector housing 15 is formed by injection-molding an insulating synthetic resin material. As shown in FIG. 3, the female connector housing 15 includes a plurality of cavities (not shown) extending in the front-rear direction. A plurality of female terminals 19 are respectively accommodated in the plurality of cavities. Wires 20 are respectively connected to the plurality of female terminals 19. As shown in FIG. 3, the wires 20 are pulled out rearward from the cavities.

[Cover 16]

As shown in FIG. 3, the cover 16 is mounted on the female connector housing 15 to cover the female connector housing 15. A front end part of the cover 16 is formed with window portions 21 penetrating in the front-rear direction at positions corresponding to the female terminals 19 disposed in the female connector housing 15. The male terminal 14 is inserted into the female connector housing 15 through the window portion 21 of the cover 16 and electrically connected to the female terminal 19.

As shown in FIG. 3, the cover 16 has an upper wall 22 (an example of a side wall) for covering the female connector housing 15 from above and a lower wall (an example of the side wall) for covering the female connector housing 15 from below. A rear end part of the upper wall 22 and that of the lower wall 23 are coupled by a rear wall 24.

As shown in FIG. 3, the cover 16 includes base portions 25, in which the upper and lower walls 22, 23 are disposed in parallel, and bulging portions 26 in which an interval between the upper and lower walls 22, 23 is larger than in the base portions 25. In the base portions 25, the upper and lower walls 22, 23 are formed to extend substantially in parallel. Substantially in parallel means not only a case where the upper and lower walls 22, 23 are parallel, but also a case where the upper and lower walls 22, 23 are not parallel, but can be recognized to be substantially in parallel. The bulging portions 26 are formed at positions near a rear end part of the cover 16. In the bulging portions 26, the upper wall 22 bulges upward and the lower wall 23 bulges downward.

The wires 20 led out rearward from a rear end part of the female connector housing 15 are bent leftward in the cover 16. The wires 20 press the rear wall 24 of the cover 16 from front by reaction forces generated by leftward bending. In this way, the wires 20 are located inside the bulging portions 26 provided at the positions near the rear end part of the cover 16. In FIG. 3, contour lines of the wires 20 pulled into the cover 16 from the female connector housing 15 are shown by two-dot chain lines.

As shown in FIG. 3, the cover 16 includes a coupling portion 27 coupling the base portion 25 and the bulging portion 26 at each of the upper and lower walls 22, 23. The coupling portion 27 is obliquely formed into a tapered shape from the bulging portion 26 toward the base portion 25.

Figure 4:
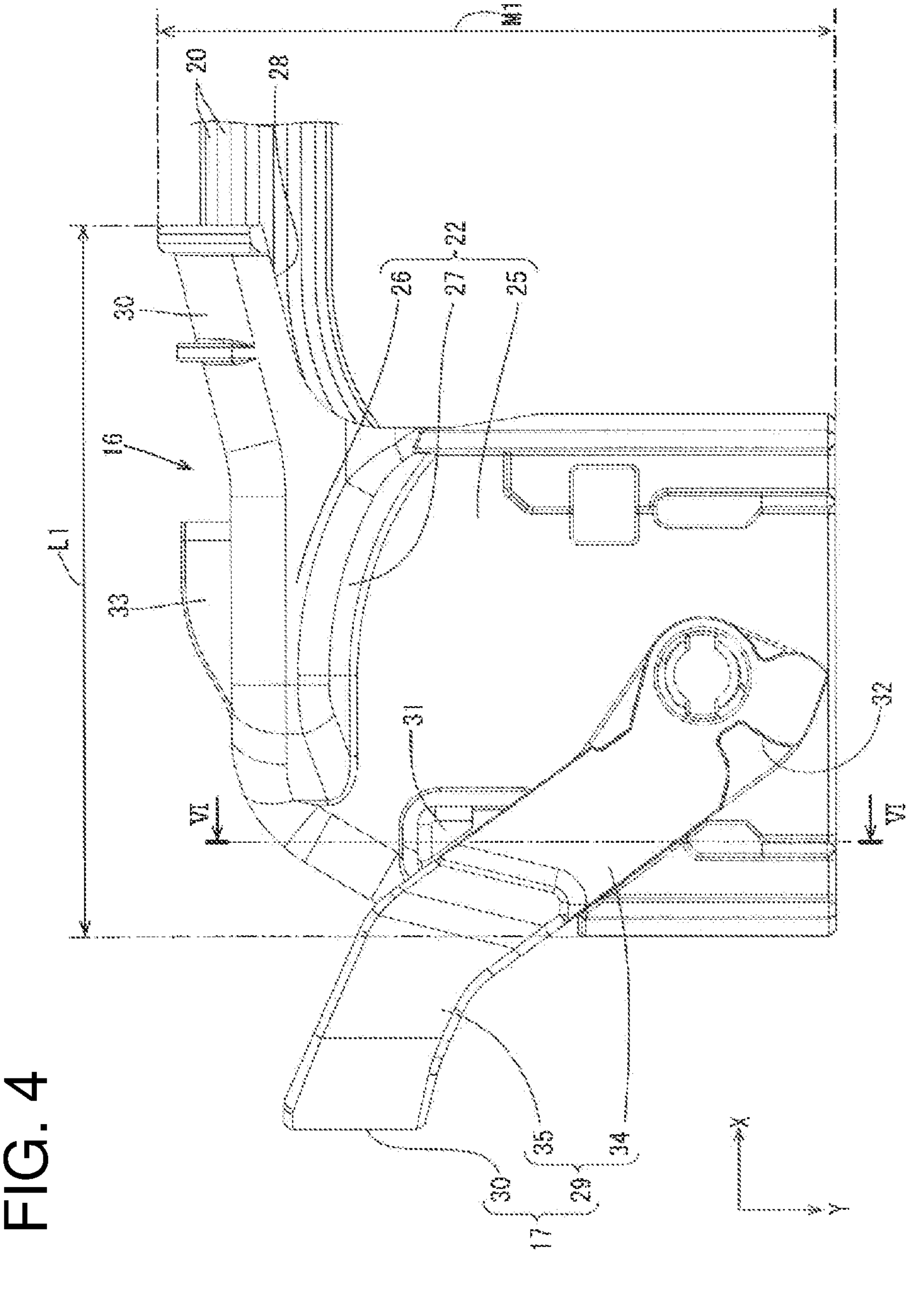
FIG. 4 is a side view showing a cover.

As shown in FIG. 4, a left rear end part of the cover 16 is open leftward and serves as a wire lead-out portion 28, through which the wires 20 are pulled out leftward.

[Lever 17]

Figure 5:
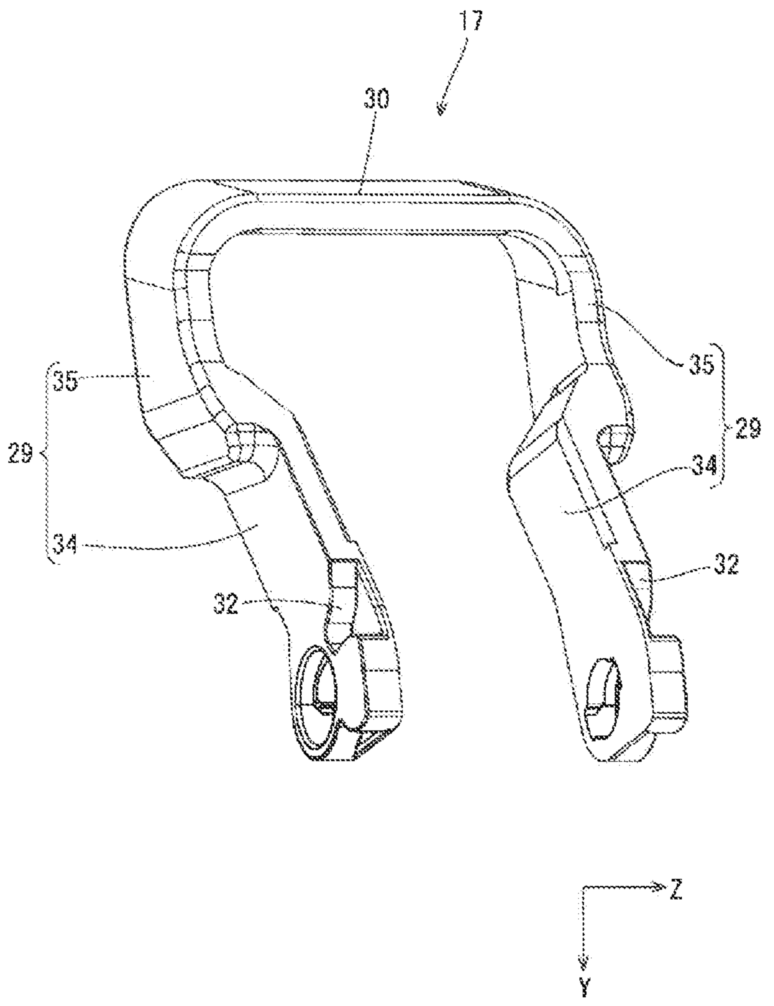
FIG. 5 is a perspective view showing a lever.

As shown in FIG. 5, the lever 17 includes two side plates 29 and a rear plate 30 coupling rear end parts of the two side plates 29. The two side plates 29 are rotatably mounted on the upper and lower walls 22, 23 of the cover 16. Since the lever 17 is rotatably mounted on the cover 16, the forward direction is represented by the arrow Y and the upward direction is represented by the arrow Z in FIG. 5.

Out of the lever 17, substantially half parts from a front end part toward a rear side serve as narrow portions 34 in which an interval between the two side plates 29 in a vertical direction is relatively narrow. Out of the lever 17, parts behind the narrow portions 34 serve as wide portions 35 in which the interval between the two side plates 29 in the vertical direction is wider than in the narrow portions 34.

The lever 17 is rotatable between a connection start position (position of the lever 17 shown in FIG. 4) and a connection end position (position of the lever 17 shown in FIG. 2).

As shown in FIG. 4, the connection start position is the position of the lever 17 in a state before the female connector housing 15 is connected to the male connector housing 13. A first lock portion 31 is provided at a position near a left end part of the upper wall 22 of the cover 16. The first lock portion 31 is engaged with the lever 17 at the connection start position, thereby suppressing the rotation of the lever 17 toward the connection end position. The first lock portion 31 is in the form of a plate and resiliently deformable in a direction (vertical direction) intersecting the plate surfaces of the two side plates 29. If the first lock portion 31 is deflected and deformed inwardly of the cover 16, an engaged state of the lever 17 and the first lock portion 31 is released and the lever 17 becomes rotatable toward the connection end position.

As shown in FIG. 2, the connection end position is the position of the lever 17 in a state after the female connector housing 15 is connected to the male connector housing 13. As shown in FIG. 5, recesses 32 recessed from side edges of the two side plates 29 are provided at positions near front end parts of the two side plates 29. Projections (not shown) provided at positions corresponding to the recesses 32, out of the male connector housing 13, are fit into the recesses 32.

If the lever 17 rotates from the connection start position to the connection end position with the projections fit in the recesses 32, the projections fit in the recesses 32 are pulled rearward, whereby the male connector housing 13 moves rearward. Then, the female connector housing 15 enters the receptacle 12 of the male connector housing 13 from behind. If the lever 17 reaches the connection end position, the female connector housing 15 is fit into the receptacle 12 of the male connector housing 13. In this way, the connection of the male connector housing 13 and the female connector housing 15 is completed.

A second lock portion 33 projecting rearward is provided on a left end part of the rear wall 24 of the cover 16. A left end part of the second lock portion 33 comes into contact with the rear plate 30 of the lever 17 from right, thereby suppressing the rotation of the lever 17 from the connection end position toward the connection start position. As shown in FIG. 1, the second lock portion 33 is U-shaped when viewed from behind, and resiliently deformable in a direction (front-rear direction) intersecting the plate surfaces of the rear wall 24.

[Contact Structure of Narrow Portions 34 and Base Portions 25]

Figure 6:
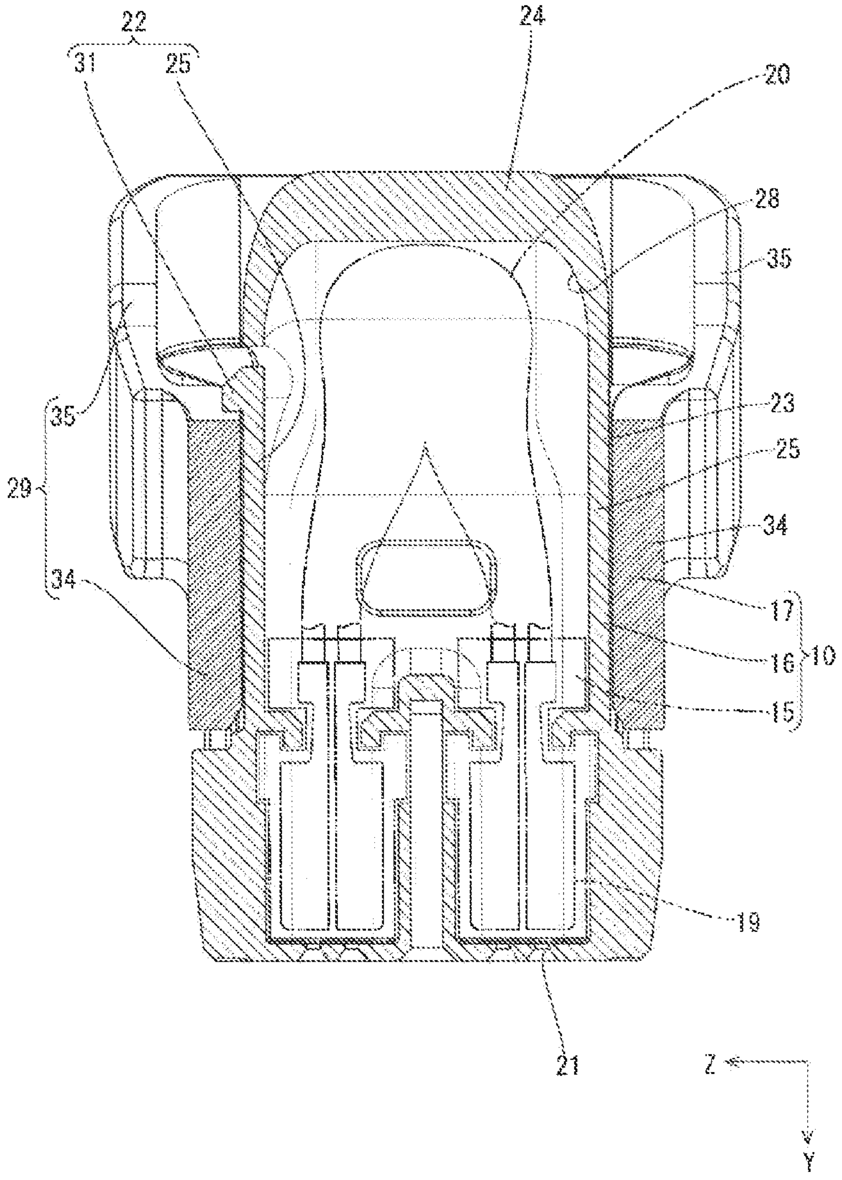
FIG. 6 is a section along VI-VI in FIG. 4.

As shown in FIG. 6, the inner surfaces of the narrow portions 34 of the lever 17 are in contact with the outer surfaces of the base portions 25 of the cover 16. When the lever 17 rotates between the connection start position and the connection end position, the inner surfaces of the narrow portions 34 of the lever 17 and the outer surfaces of the base portions 25 of the cover 16 slide in contact.

[Contact Structure of Wide Portions 35 and Bulging Portions 26]

With the lever 17 located near the connection end position, the inner surfaces of the wide portions 35 of the lever 17 are in contact with the outer surfaces of the bulging portions 26 of the cover 16. The vicinity of the connection end position of the lever 17 includes the connection end position. Further, the vicinity of the connection end position of the lever 17 also includes a state where the lever 17 is in contact with the second lock portion 33 of the cover 16 to deflect and deform the second lock portion 33 forward. FIG. 3 shows the contact of the inner surfaces of the wide portions 35 of the lever 17 with the outer surface of the bulging portions 26 of the cover 16 with the lever 17 held at the connection end position by the second lock portion 33.

[Functions and Effects of Embodiment]

Next, functions and effects of this embodiment are described. The lever-type connector 10 according to this embodiment is provided with the female connector housing 15 to be connected to the male connector housing 13, the cover 16 to be mounted on the female connector housing 15 to cover the wires 20 pulled out from the female connector housing 15 in a state bent in a direction different from a pull-out direction from the female connector housing 15, and the lever 17 to be mounted on the female connector housing 15 and rotatable between the connection start position and the connection end position. The cover 16 includes the upper wall 22, the lower wall 23 and the rear wall 24 coupling the upper and lower walls 22, 23. The cover 16 includes the base portions 25 provided at the positions near the female connector housing 15 with the cover 16 mounted on the female connector housing 15, and the bulging portions 26 having a larger interval between the upper and lower walls 22, 23 than the base portions 24 at the positions near the rear wall 24. The lever 17 is disposed outside the cover 16. The lever 17 includes the two side plates 29 and the rear plate 30 coupling the two side plates 29. The lever 17 includes the narrow portions 34 provided at the positions near the female connector housing 15 with the lever 17 mounted on the female connector housing 15 and the wide portions 35 having a larger interval between the two side plates 29 than the narrow portions 34 at the positions near the rear plate.

Since the wires 20 are disposed inside the bulging portions 26 of the cover 16, a length of the cover 16 can be reduced in the front-rear direction as compared to the case where the bulging portions 26 are not provided. In this way, the enlargement of the lever-type connector 10 as a whole can be suppressed even if the number of the wires 20 to be led out from the female connector housing 15 is increased.

Further, according to this embodiment, the inner surfaces of the wide portions 35 of the lever 17 contact the outer surfaces of the bulging portions 26 of the cover 16 at least near the connection end position. Note that as described above, the vicinity of the connection end position of the lever 17 includes the connection end position and also includes the state where the lever 17 is in contact with the second lock portion 33 of the cover 16 to deflect and deform the second lock portion 33 forward.

The lever 17 according to this embodiment includes the wide portions 35 projecting further than the narrow portions 34 in the vertical direction. Thus, there is a concern for the deformation of the lever 17 due to the collision of an external matter with the wide portion 35. If the lever 17 is deformed while being held at the connection end position, there is a concern for the rotation of the lever 17 from the connection end position toward the connection start position. In this embodiment, the deflection and deformation of the narrow portions 34 of the lever 17 in directions toward each other are suppressed by the base portions 25 of the cover 16. In this way, the rotation of the lever 17 from the connection end position toward the connection start position can be suppressed even if an external matter collides with the wide portion 35.

Further, immediately before the lever 17 rotates to the connection end position, the lever 17 contacts the second lock portion 33 and deflects and deforms the second lock portion 33. At this time, a relatively large force is applied to the wide portions 35. Since the inner surfaces of the wide portions 35 of the lever 17 are in contact with the outer surface of the bulging portions 26 of the cover 16 in this embodiment, the deflection and deformation of the wide portions 35 in directions toward each other can be suppressed even if a relatively large force is applied to the wide portions 35.

Further, according to this embodiment, the inner surfaces of the narrow portions 34 of the lever 17 are in contact with the outer surfaces of the base portions 25 of the cover 16.

Since the narrow portions 34 of the lever 17 are supported from inside by the base portions 25 of the cover 16, the deflection and deformation of the narrow portions 34 of the lever 17 in the directions toward each other are suppressed when the lever 17 rotates between the connection start position and the connection end position. Further, since the lever 17 is guided by the outer surfaces of the base portions 25 of the cover 16, the lever 17 can be smoothly rotated between the connection start position and the connection end position.

Further, according to this embodiment, the cover 16 includes the coupling portions 27 coupling the bulging portions 26 and the base portions 25, and fingers are placed on the coupling portions 27 when the cover 16 is mounted on the connector housing or when the cover 16 is removed from the connector housing.

There are steps between the bulging portions 26 and the base portions 25. These steps are coupled by the coupling portions 27. When a worker holds the cover 16, the cover 16 can be easily held by placing the worker's fingers on the coupling portions 27. Further, the worker can easily separate the lever-type connector 10 from the male connector 11 by placing the fingers on the coupling portions 27 and pulling the coupling portions 27 rearward.

Second Embodiment

Next, a lever-type connector 40 according to a second embodiment of the present disclosure is described with reference to FIGS. 7 to 10.

[Female Connector Housing 45]

Figure 7:
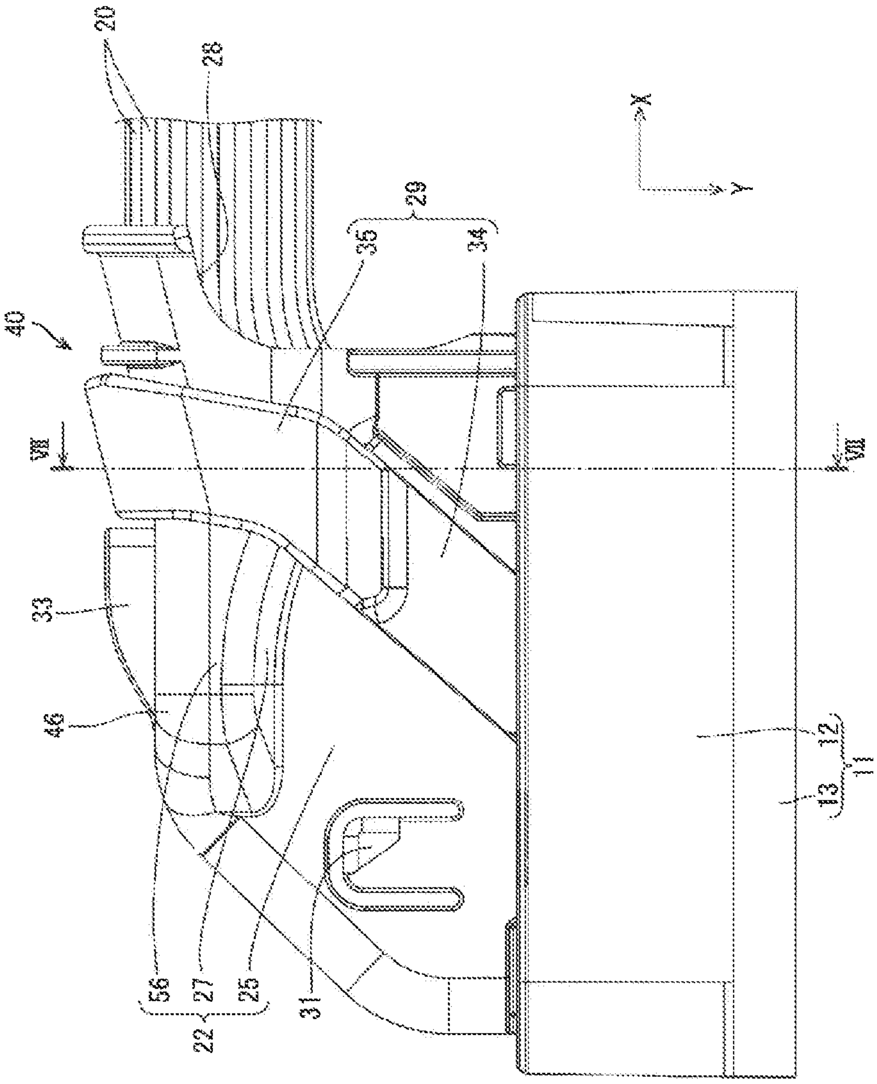
FIG. 7 is a side view showing a lever-type connector according to a second embodiment.
Figure 8:
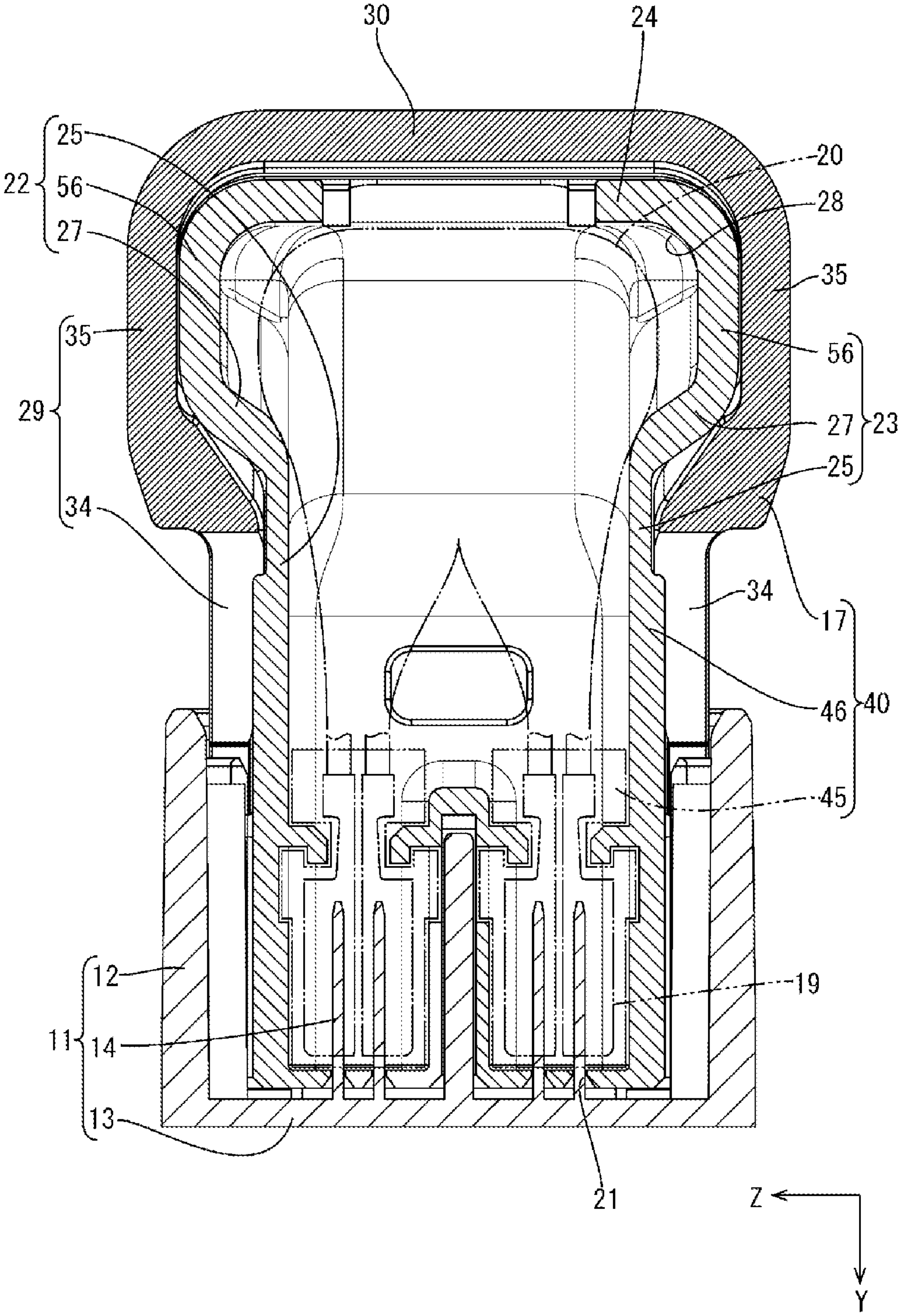
FIG. 8 is a section along VIII-VIII in FIG. 7.
Figure 9:
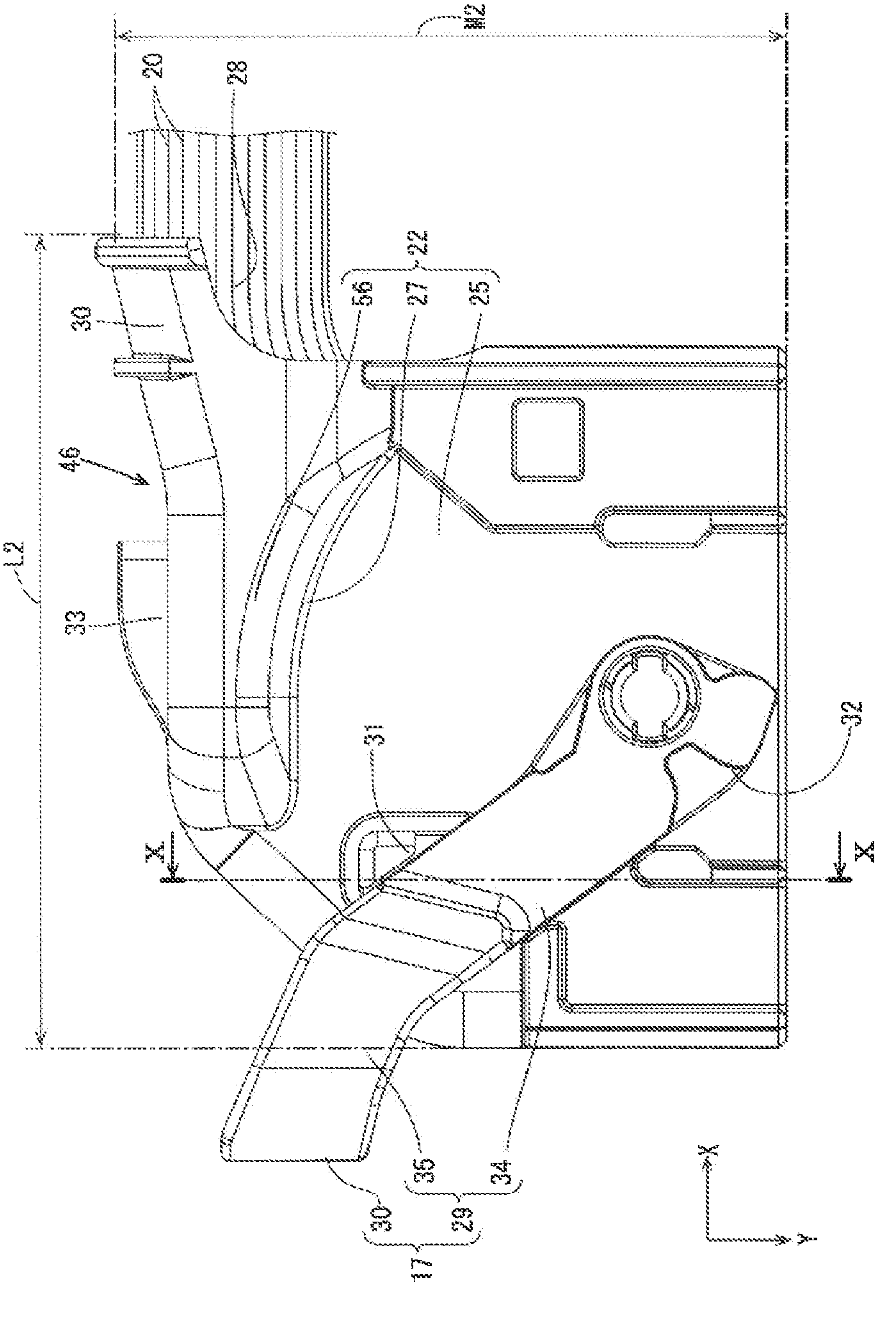
FIG. 9 is a side view showing a cover.

As shown in FIG. 7, a length of a lever-type connector 40 according to the second embodiment in a lateral direction is larger than that of the lever-type connector 10 according to the first embodiment in the lateral direction. FIG. 8 shows a female connector housing 45 according to the second embodiment. Although not shown in detail, a length of the female connector housing 45 according to the second embodiment in the lateral direction is larger than that of the female connector housing 15 according to the first embodiment in the lateral direction. The number of wires 20 to be led out from the female connector housing 45 according to the second embodiment is more than the number of the wires 20 to be led out from the female connector housing 15 according to the first embodiment.

[Cover 46]

A length L2 (see FIG. 9) of a cover 46 according to the second embodiment in the lateral direction is larger than a length L1 (see FIG. 4) of the cover 16 according to the first embodiment in the lateral direction. In the front-rear direction, a length M2 (see FIG. 9) of the cover 46 according to the second embodiment is equal to a length M1 (see FIG. 4) of the cover 16 according to the first embodiment.

Figure 10:
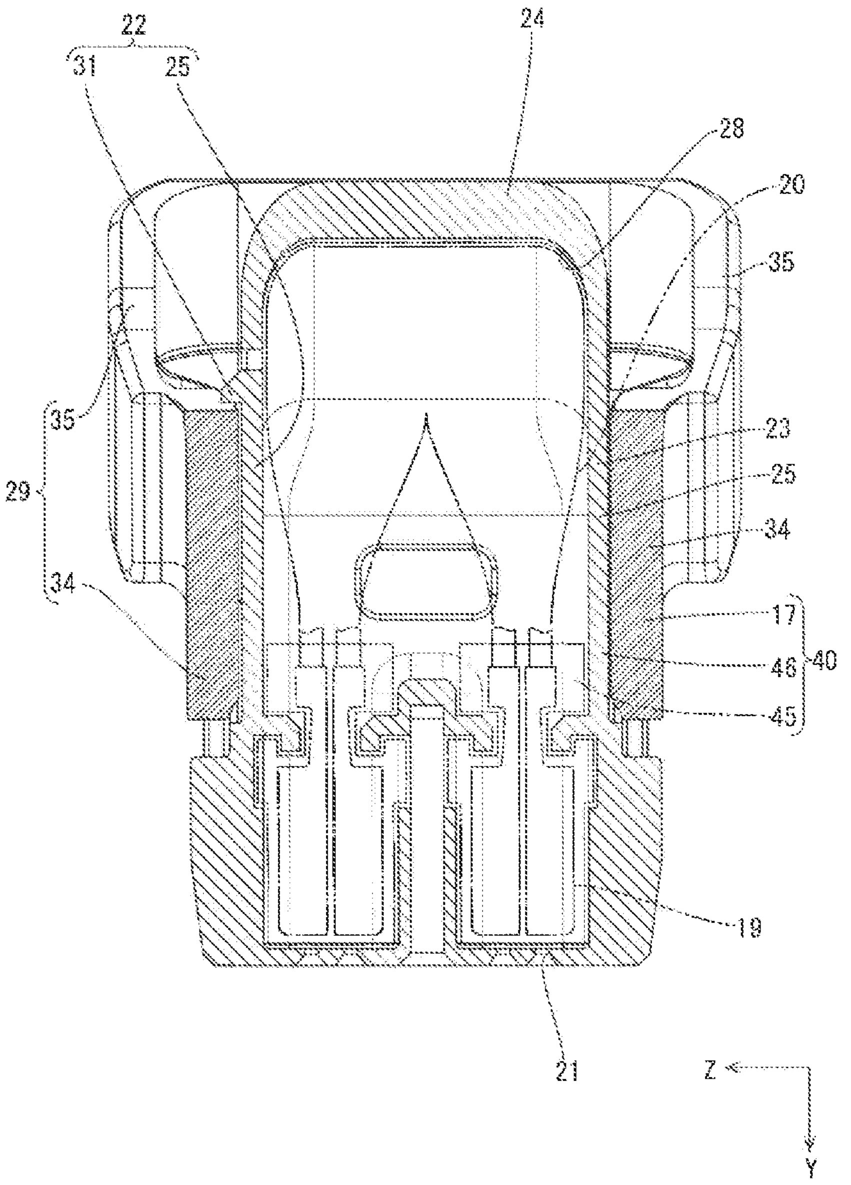
FIG. 10 is a section along X-X in FIG. 9.

As shown in FIGS. 8 and 10, the cover 46 is mounted on the female connector housing 45 to cover the female connector housing 45. As shown in FIG. 8, a front end part of the cover 46 is formed with window portions 21 penetrating in the front-rear direction at positions corresponding to female terminals 19 accommodated in the female connector housing 45. A male terminal 14 is introduced into the female connector housing 45 through the window portion 21 of the cover 46 and electrically connected to the female terminal 19.

[Lever 17]

A lever 17 according to the second embodiment has the same shape and size as the lever 17 according to the first embodiment.

Since the other configuration is substantially the same as in the first embodiment, the same members are denoted by the same reference signs and repeated description is omitted.

By forming the cover 46 with bulging portions 56, the wires 20 are disposed inside the bulging portions 56 bulging in the vertical direction even if the number of the wires 20 to be led out from the female connector housing 45 is increased. Thus, an increase in the length of the cover 46 in the front-rear direction is suppressed. Further, since the lever 17 is formed with wide portions 35 corresponding to the bulging portions 56 of the cover 46, an increase in the length of the lever 17 in the front-rear direction is also suppressed. As a result, even if the number of the wires 20 to be led out from the female connector housing 45 is increased, the manufacturing cost of the lever-type connector 40 can be reduced since the lever 17 of the same shape and size can be used.

Other Embodiments (1) The inner surfaces of the wide portions 35 of the lever 17 and the outer surfaces of the bulging portions 26 of the cover 16 may be constantly in contact when the lever 17 rotates between the connection start position and the connection end position.

(2) The inner surfaces of the wide portions 35 of the lever 17 and the outer surfaces of the bulging portions 26 of the cover 16 may be separated when the lever 17 rotates between the connection start position and the connection end position.

(3) The inner surfaces of the narrow portions 34 of the lever 17 and the outer surfaces of the base portions 25 of the cover 16 may be separated when the lever 17 rotates between the connection start position and the connection end position.

(4) The number of the wires 20 to be led out from the connector housing is not limited and can be arbitrary.

(5) The cover 16 may be mounted on the rear end part of the female connector housing 15.

LIST OF REFERENCE NUMERALS

10, 40: lever-type connector
11: male connector
12: receptacle
13: male connector housing
14: male terminal
15, 45: female connector housing
16, 46: cover
17: lever
19: female terminal
20 wire
21: window portion
22: upper wall
23: lower wall
24: rear wall
25: base portion
26, 56: bulging portion
27: coupling portion
28: wire lead-out portion
29: side plate
30: rear plate
31: first lock portion
32: recess
33: second lock portion
34: narrow portion
35: wide portion

What is claimed is:

1. A lever-type connector, comprising:

a connector housing to be connected to a mating connector housing;

a cover to be mounted on the connector housing, the cover covering a wire pulled out from the connector housing in a state bent in a direction different from a pull-out direction from the connector housing; and a lever to be mounted on the connector housing, the lever being rotatable between a connection start position and a connection end position, the cover including two side walls, a rear wall coupling the two side walls, a right wall coupling right ends of the two side walls and a wire lead-out portion open leftward in left end parts of the two side walls, the cover including base portions provided at positions near the connector housing with the cover mounted on the connector housing and bulging portions located near the rear wall and in a range not reaching the right wall and having a larger interval between the two side walls than the base portions, the lever being disposed outside the cover, the lever including two side plates and a rear plate coupling the two side plates, the cover including:

a first lock portion provided at a position adjacent to the left end parts of the two side walls and configured to engage with the lever at the connection start position to suppress rotation of the lever toward the connection end position; and a second lock portion provided on a left end part of the rear wall, the second lock portion protruding rearward and having a left end part configured to contact the rear plate of the lever from a right side to suppress the rotation of the lever from the connection end position toward the connection start position, the lever including narrow portions provided at positions near the connector housing with the lever mounted on the connector housing and wide portions having a larger interval between the two side plates than the narrow portions at positions near the rear plate, the connector housing including a rotary shaft for rotatably supporting the lever, the wire being pulled out leftward from the wire lead-out portion, and right ends of the bulging portions being located to the right of the rotary shaft.

2. The lever-type connector according to claim 1, wherein inner surfaces of the wide portions of the lever contact outer surfaces of the bulging portions of the cover at least near the connection end position.

3. The lever-type connector according to claim 1, wherein inner surfaces of the narrow portions of the lever are in contact with outer surfaces of the base portions of the cover.

4. The lever-type connector according to claim 1, wherein:

the cover includes coupling portions coupling the bulging portions and the base portions, and the coupling portions are configured to provide finger placement areas to facilitate mounting or removal of the cover from the connector housing.

5. The lever-type connector according to claim 1, wherein the first lock portion is in a form of a plate and resiliently deformable in a direction intersecting surfaces of the two side walls.

6. The lever-type connector according to claim 1, wherein the second lock portion is U-shaped when viewed from behind, and resiliently deformable in a direction intersecting surfaces of the rear wall.

* * * * *